(12) United States Patent
Jribi et al.

(10) Patent No.: US 9,977,162 B2
(45) Date of Patent: May 22, 2018

(54) SUBSTRATE HAVING A MULTILAYER WITH THERMAL PROPERTIES AND AN ABSORBING LAYER

(71) Applicant: SAINT-GOBAIN GLASS FRANCE, Courbevoie (FR)

(72) Inventors: Ramzi Jribi, Paris (FR); Jean-Carlos Lorenzzi, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 191 days.

(21) Appl. No.: 14/429,892

(22) PCT Filed: Sep. 20, 2013

(86) PCT No.: PCT/FR2013/052175
§ 371 (c)(1),
(2) Date: Mar. 20, 2015

(87) PCT Pub. No.: WO2014/044984
PCT Pub. Date: Mar. 27, 2014

(65) Prior Publication Data
US 2015/0247961 A1    Sep. 3, 2015

(30) Foreign Application Priority Data

Sep. 21, 2012 (FR) ...................... 12 58867

(51) Int. Cl.
*G02B 5/28* (2006.01)
*C03C 17/36* (2006.01)
*G02B 5/08* (2006.01)

(52) U.S. Cl.
CPC ............ *G02B 5/282* (2013.01); *C03C 17/36* (2013.01); *C03C 17/361* (2013.01);
(Continued)

(58) Field of Classification Search
CPC ........ G02B 5/282; G02B 5/085; C03C 17/36; C03C 17/361; C03C 17/3626;
(Continued)

(56) References Cited

U.S. PATENT DOCUMENTS 6,592,996 B1   7/2003  Kunisada et al.
2005/0123772 A1  6/2005  Coustet et al.
(Continued)

FOREIGN PATENT DOCUMENTS

WO    02 48065    6/2002

OTHER PUBLICATIONS

International Search Report dated Jan. 22, 2014 in PCT/FR13/052175 Filed Sep. 20, 2013.

*Primary Examiner* — Bumsuk Won
*Assistant Examiner* — Wen Huang
(74) *Attorney, Agent, or Firm* — Oblon, McClelland, Maier & Neustadt, L.L.P.

(57) ABSTRACT

The invention relates to a substrate (10) coated on one face (11) with a multilayer of thin films (14) with reflective properties in the infrared and/or in the solar radiation band comprising a single functional metal layer (140), in particular of silver or of a metal alloy containing silver, and two dielectric coatings (120, 160), said coatings each comprising at least one dielectric layer (122, 164), said functional layer (140) being disposed between the two dielectric coatings (120, 160), said multilayer furthermore comprising a single absorbing layer (19), characterized in that said absorbing layer (19) is a metal layer having a physical thickness in the range between 0.5 nm and 1.5 nm, or even between 0.6 nm and 1.2 nm and is situated directly on said face (11) and directly under a dielectric layer of nitride not comprising any oxygen.

13 Claims, 2 Drawing Sheets

(52) U.S. Cl.
CPC ........ *C03C 17/366* (2013.01); *C03C 17/3626* (2013.01); *C03C 17/3644* (2013.01); *C03C 17/3652* (2013.01); *C03C 17/3681* (2013.01); *G02B 5/085* (2013.01); *Y02B 80/22* (2013.01)

(58) Field of Classification Search
CPC ............ C03C 17/3644; C03C 17/3652; C03C 17/366; C03C 17/3681; Y02B 80/22; E06B 3/6715
USPC .......... 359/360; 428/34, 432, 433, 434, 698, 428/699, 701, 704; 52/786.1, 786.11, 52/786.13; 156/109
See application file for complete search history.

(56) References Cited

U.S. PATENT DOCUMENTS

| | | | |
|---|---|---|---|
| 2011/0261442 A1 | 10/2011 | Knoll et al. | |
| 2011/0305853 A1* | 12/2011 | Reymond | ............... C03C 17/36 428/34 |
| 2013/0088773 A1 | 4/2013 | Knoll et al. | |

* cited by examiner

SUBSTRATE HAVING A MULTILAYER WITH THERMAL PROPERTIES AND AN ABSORBING LAYER

CROSS-REFERENCE TO RELATED APPLICATIONS

This application is a National Stage of PCT/FR2013/052175 filed on Sep. 20, 2013. This application is based upon and claims the benefit of priority to French Application No. 1258867 filed on Sep. 21, 2012, the contents of which are incorporated herein by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF THE MATERIAL ON THE COMPACT DISC

Not applicable.

BACKGROUND OF THE INVENTION

Field of the Invention

The invention relates to a multiple glazing unit comprising at least two substrates, of the glass substrate type, which are held together by a chassis structure, said glazing unit forming a separation between an external space and an internal space, in which at least one separation gas layer is disposed between the two substrates.

Description of the Related Art Including Information Disclosed Under 37 CFR 1.97 and 1.98

In a known manner, one of the substrates may be coated, on an internal face in contact with the gas separation layer, with a stack of thin films with reflective properties in the infrared and/or in the solar radiation band comprising a single functional metal layer, in particular based on silver or a metal alloy containing silver, and two dielectric coatings, said coatings each comprising at least one dielectric layer, said functional layer being disposed between the two dielectric coatings.

The invention relates more particularly to the use of such substrates for the fabrication of glazing units for thermal insulation and/or for protection from the sun. These glazing units may be designed to equip buildings, with a view notably to reducing the air conditioning demands and/or to preventing excessive overheating (glazing units referred to as solar control panels) and/or reducing the quantity of energy dissipated toward the outside (glazing units referred to as low-emissive panels) driven by the ever-increasing glass surface areas in buildings.

These glazing units may furthermore be integrated into glazing units having particular functionalities, such as for example heating glazing units or electrochromic glazing units.

One type of multilayer known for endowing substrates with such properties is composed of a functional metal layer with reflective properties in the infrared and/or in the solar radiation band, notably a functional metal layer based on silver or a metal alloy containing silver.

In this type of multilayer, the functional layer is thus disposed between two dielectric coatings each comprising, in general, several layers which each consist of a dielectric material of the nitride type, and notably a nitride of silicon or of aluminum, or an oxide. From the optical point of view, the goal of these coatings which sandwich the functional metal layer is "to antireflect" this functional metal layer.

A barrier coating is however sometimes sandwiched between one or each dielectric coating and the functional metal layer, the barrier coating disposed under the functional layer in the direction of the substrate protecting it during a potential heat treatment at high temperature, of the forming and/or dip-coating type, and the barrier coating disposed on the functional layer in the opposite direction from the substrate protects this layer from a potential degradation during the deposition of the upper dielectric coating and during a potential heat treatment at high temperature, of the forming and/or dip-coating type.

It is recalled that the solar factor of a glazing unit is the ratio of the total solar energy entering into the room through this glazing unit over the total incident solar energy and the selectivity corresponds to the ratio of the light transmission $T_{Lvis}$ in the visible of the glazing unit over the solar factor FS of the glazing unit and is such that: $S=T_{Lvis}/FS$.

Currently, low-emissive multilayers of thin films exist with a single functional layer (henceforth denoted by the expression "functional monolayer stack"), using silver, exhibiting a normal emissivity $\varepsilon_N$ of the order of 2 to 3%, a light transmission in the visible $T_L$ of around 65%, an external light reflection in the visible of less than 20% and a selectivity of approximately 1.3 to 1.35 for a solar factor of around 50% when they are installed in a conventional double glazing unit, such as for example as the face 3 of a configuration: 4-16(Ar—90%)-4, composed of two 4 mm glass sheets separated by a gas separation layer with 90% argon and 10% air and a thickness of 16 mm, one sheet of which is coated with the functional monolayer stack: the sheet furthest to the interior of the building when considering the incident direction of the sunlight entering into the building; on its face turned toward the gas separation layer.

Those skilled in the art know that positioning the multilayer of thin films on face 2 of the double glazing unit (on the sheet furthest to the exterior of the building when considering the incident direction of the sunlight entering into the building and on its face turned toward the layer of gas) will allow it to decrease the solar factor and to thus increase the selectivity.

In the framework of the example hereinabove, it is then possible to obtain a selectivity of the order of 1.5 with the same functional monolayer stack.

However, this solution is not satisfactory for some applications because the light reflection in the visible, and in particular the light reflection in the visible seen from the outside of the building, is then at a relatively high level, greater than 23%.

In order to reduce this light reflection, while at the same time conserving the energy reflection, or even increasing it, those skilled in the art know that they can introduce into the multilayer, and more particularly on the inside of one (or of several) dielectric coating(s), one (or several) layer(s) absorbing in the visible.

It should be noted that the use of such layers absorbing in the visible in multilayers with several functional layers is already known from the prior art, in particular from the international patent application No. WO 02/48065 which relates to the use of such layers absorbing in the visible in a multilayer resistant to a heat treatment of the forming/dip-coating type.

However, owing to the complexity of the multilayer and of the quantity of deposited material, these multilayers with several functional layers cost more to manufacture than functional monolayer stacks.

Furthermore, owing also to the complexity of this functional bilayer stack, the teaching of this document is not directly transposable for the design of a functional monolayer stack.

A functional monolayer stack of thin films is furthermore known from the prior art, from the international patent application No. WO 2010/072974, in which the two dielectric coatings each comprise at least one absorbing layer which is disposed within the dielectric coating between two dielectric layers, the absorbing material of the absorbing layers being disposed symmetrically on either side of the functional metal layer.

This multilayer allows a low external light reflection in the visible to be achieved, together with an acceptable coloring, but it would be desirable to be able to conserve these properties while at the same time obtaining a higher light transmission in the visible.

Furthermore known in the prior art from the U.S. Pat. No. 6,592,996 is one example 9 where a single metal absorbing layer is deposited directly onto one face of a substrate and under a layer of oxide. This layer is relatively thick and, as a layer of oxide is deposited directly onto this metal layer, in reality, a non-negligible part (at least 20% of the total thickness) of the part of the metal layer situated near to the layer of oxide is oxidized. A non-negligible quantity of material (Ti) finally loses its primary function of being absorbing and becomes antireflecting.

The aim of the invention is to be able to overcome the drawbacks of the prior art, by providing a new type of functional monolayer stack, which stack exhibits a low resistance per square (and hence a low emissivity), a higher light transmission and a relatively neutral color, in particular in reflection on the layer side (but also on the opposite side: "substrate side"), and that these properties are preferably conserved over a limited range whether or not the multilayer undergoes one (or more) thermal treatment(s) at high temperature of the forming and/or dip-coating and/or annealing type.

Another important aim is to provide a functional monolayer stack which exhibits a low emissivity while at the same time having a low light reflection in the visible but a light transmission in the visible that is higher than beforehand, together with an acceptable coloring, notably in external reflection of the multiple glazing unit, in particular which is not in the red band.

Another important aim is to include the use of an absorbing metal layer directly in contact with the substrate and to guarantee that this layer remains metallic and absorbing once the multilayer is deposited.

BRIEF SUMMARY OF THE INVENTION

The subject of the invention is thus, in its broadest sense, a substrate coated on one face with a multilayer of thin films with reflective properties in the infrared and/or in the solar radiation band comprising a single functional metal layer, in particular of silver or of a metal alloy containing silver and two dielectric coatings, said coatings each comprising at least one dielectric layer, said functional layer being disposed between the two dielectric coatings, said multilayer furthermore comprising a single absorbing layer.

According to the invention, said absorbing layer is a metal layer having a physical thickness in the range between 0.5 nm and 1.5 nm, or even between 0.6 nm and 1.2 nm and is situated directly on said face of the substrate and directly under a dielectric layer based on nitride not comprising any oxygen.

Indeed, it has been discovered that depositing a layer based on nitride directly onto an absorbing metal layer has only a small effect on the nature of the metal layer at the interface between these two layers: the absorbing metal layer thus remains metallic over the whole of its thickness; it is no longer necessary to provide a very thick layer and it is no longer necessary to anticipate a modification of the nature of the absorbing metal layer over a part of its thickness. After deposition of the multilayer, it can be observed that it is metallic over the whole of its thickness.

Said absorbing metal layer is preferably a layer of titanium. It has been discovered that this material exhibits a low propensity for modification when the layer deposited just above is a layer based on nitride and that does not comprise any oxygen and, in particular, when this layer is a layer based on silicon nitride without oxygen: this material can thus be deposited as a very thin layer without its surface in contact with a nitride being significantly affected (nitrided).

Said absorbing layer preferably has a thickness in the range between 0.5 and 1.5 nm, including these values, or between 0.6 and 1.2 nm, or even between 0.6 and 1.1 nm, including these values, so as not to be too detrimental to light transmission.

The term "coating" in the sense of the present invention should be taken to mean that there can be a single layer or several layers of different materials within the coating.

As is usual, the term "dielectric layer" in the sense of the present invention should be understood to mean that, from the point of view of its nature, the material is "non-metallic", in other words is not a metal. In the context of the invention, this term denotes a material having a ratio n/k over the whole of the visible wavelength range (from 380 nm to 780 nm) greater than or equal to 5.

The term "absorbing layer" in the sense of the present invention should be understood to mean that the layer is a material having a ratio n/k over the whole of the visible wavelength range (from 380 nm to 780 nm) between 0 and 5 excluding these values and having a bulk electrical resistivity (such as is known in the literature) greater than $10^{-5}$ $\Omega \cdot cm$.

It is recalled that n denotes the real refractive index of the material at a given wavelength and k represents the imaginary part of the refractive index at a given wavelength; the ratio n/k being calculated at a given wavelength being identical for n and for k.

The term "absorbing metal layer" in that sense of the present invention should be taken as meaning the layer is absorbing as indicated hereinbefore and that it does not comprise any atoms of oxygen, nor any atoms of nitrogen.

In one particular version of the invention, on at least one face in contact with a gas separation layer, at least one substrate comprises an antireflective coating which is facing said gas separation layer with a multilayer of thin films with reflective properties in the infrared and/or in the solar radiation band.

This version allows an even higher selectivity to be attained, thanks to a significant increase in the light transmission and to a lesser increase in the solar factor of the multiple glazing unit.

The physical thickness of said functional metal layer is preferably in the range between 15 nm and 20 nm, including these values, in order to achieve an emissivity <2.5%.

In another particular version of the invention, said dielectric coating disposed or situated between the face of the substrate and said functional metal layer comprises a high index layer of a material having a refractive index in the range between 2.3 and 2.7, this layer being preferably a layer based on oxide. The values of refractive index indicated in the present document are the values measured, as is usual, at the wavelength of 550 nm.

This high index layer preferably has a physical thickness in the range between 5 and 15 nm.

This high index layer allows the high light transmission in the visible of the multilayer to be maximized and a favorable action for obtaining neutral colors, both in transmission and also in reflection.

The physical thickness of said dielectric layer based on nitride is, preferably, in the range between 10 and 20 nm, this layer being more preferably a layer based on silicon nitride $Si_3N_4$. With this thickness and preferably with this nature, the protection of the absorbing metal layer is very effective.

In another particular version of the invention, the functional layer is deposited directly onto a barrier undercoating disposed between the functional layer and the dielectric coating underlying the functional layer and/or the functional layer is deposited directly under a barrier overcoating disposed between the functional layer and the dielectric coating on top of the functional layer and the barrier undercoating and/or the barrier overcoating comprises a thin layer based on nickel or of titanium having a physical thickness e' such that $0.2$ nm$\leq$e'$\leq$2.5 nm.

In another particular version of the invention, the final layer of the underlying dielectric coating, the layer furthest from the substrate, is a layer based on oxide, deposited preferably sub-stoichiometrically, and is notably based on titanium oxide ($TiO_x$) or based on a mixed oxide of zinc and tin ($SnZnO_x$).

The multilayer can thus comprise a final layer (or overcoat), in other words a protection layer, deposited preferably as under-stoichiometric. This layer is oxidized, for the most part stoichiometrically, within the multilayer after deposition.

The invention furthermore relates to the use of a single absorbing layer for a multiple glazing unit comprising at least two substrates which are held together by a chassis structure, said glazing unit forming a separation between an external space and an internal space, in which at least one gas separation layer is disposed between the two substrates, a substrate being according to the invention, in order for said glazing unit to exhibit a selectivity s>1.45 while at the same time having a light transmission $T_L$>55%, or even for said glazing unit to exhibit a selectivity s$\geq$1.5 while at the same time having a light transmission $T_L$$\geq$57%.

Preferably, the multilayer according to the invention is positioned on face 2 of the glazing unit.

The invention furthermore relates to a multiple glazing unit comprising at least two substrates which are held together by a chassis structure, said glazing unit forming a separation between an external space and an internal space, in which at least one gas separation layer is disposed between the two substrates, a substrate being according to the invention.

Preferably, a single substrate of the multiple glazing unit comprising at least two substrates or of the multiple glazing unit comprising at least three substrates is coated on one internal face in contact with the gas separation layer with a multilayer of thin films with reflective properties in the infrared and/or in the solar radiation band.

The glazing unit according to the invention incorporates at least the substrate carrying the multilayer according to the invention, potentially associated with at least one other substrate. Each substrate may be clear or colored. One of the substrates at least can notably be made of glass with a bulk coloring. The choice of the type of coloring will depend on the level of light transmission and/or on the colorimetric aspect sought for the glazing unit once it has been manufactured.

The glazing unit according to the invention can have a laminar structure, associating notably at least two rigid substrates of the glass type with at least one sheet of thermoplastic polymer, in order to achieve a structure of the type glass/multilayer of thin films/sheet(s)/glass/gas separation layer/sheet of glass. The polymer may notably be based on polyvinylbutyral PVB, ethylene vinylacetate EVA, polyethylene terephthalate PET or polyvinylchloride PVC.

The substrates of the glazing units according to the invention are capable of undergoing a heat treatment without damaging the multilayer of thin films. They could therefore potentially be formed and/or quenched.

Advantageously, the present invention thus allows a functional monolayer stack of thin films to be formed exhibiting, when deposited on a transparent substrate, a light transmission in the visible $T_L$>60% and an external reflection in the visible $R_g$ (in other words on the glass side) of lower than 19% with neutral colors in external reflection.

When configured as a double glazing unit, the present invention allows a high selectivity S (S>1.45) and a favorable esthetic appearance ($T_{Lvis}$$\geq$55%, external $R_{Lvis}$<22%, neutral colors in external reflection) to be obtained.

The functional monolayer stack according to the invention costs less to produce than a functional bilayer stack with similar characteristics ($T_{Lvis}$, $R_{Lvis}$ and neutral colors in external reflection). It also costs less to produce than a functional monolayer stack which comprises, directly on the substrate, an absorbing metal layer a part of whose thickness is finally non-metallic (and hence is not absorbing) in the multilayer after the deposition of all the layers.

BRIEF DESCRIPTION OF THE SEVERAL VIEWS OF THE DRAWINGS

The details and advantages features of the invention will become apparent from the following non-limiting examples, illustrated with the aid of the appended figures illustrating.

In these figures, the proportions between the thicknesses of the various layers or of the various elements are not rigorously adhered to in order to facilitate their reading.

DETAILED DESCRIPTION OF THE INVENTION

Figure 1:
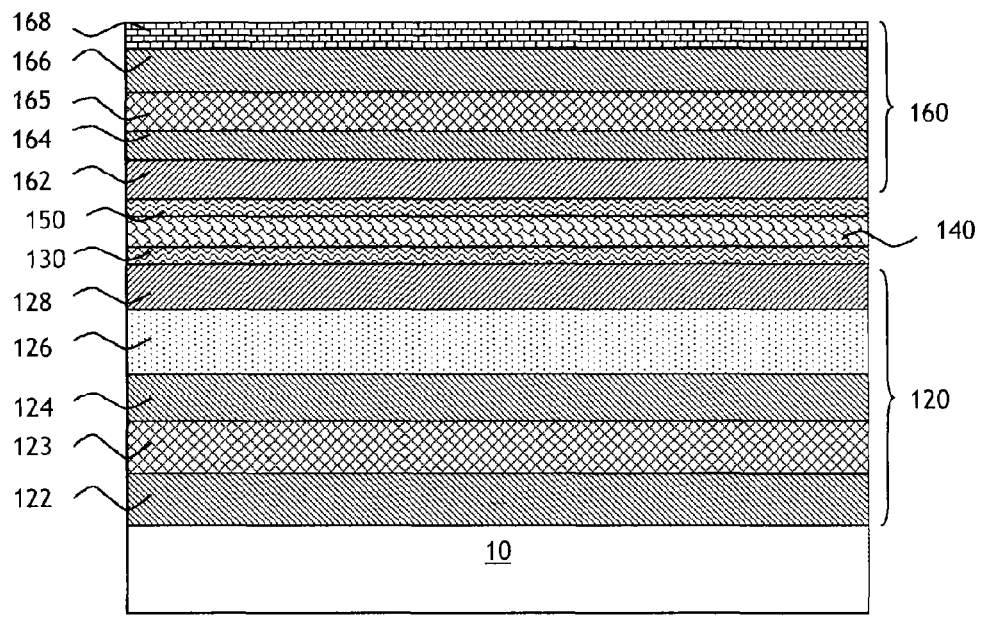
in FIG. 1, a functional monolayer stack of the prior art, the functional layer having a barrier undercoating and a barrier overcoating.

FIG. 1 illustrates a structure of a functional monolayer stack of the prior art deposited onto a glass substrate 10, being transparent, in which the single functional layer 140, in particular based on silver or of a metal alloy containing silver, is disposed between two dielectric coatings, the underlying dielectric coating 120 being situated underneath the functional layer 140 in the direction of the substrate 10 and the overlying dielectric coating 160 being disposed on top of the functional layer 140 in the opposite direction to the substrate 10.

These two dielectric coatings 120, 160 each comprise at least two dielectric layers 122, 124, 126, 128; 162, 164, 166.

Potentially, on the one hand, the functional layer 140 may be deposited directly onto a barrier undercoating 130 disposed between the underlying dielectric coating 120 and the functional layer 140 and, on the other hand, the functional layer 140 may be deposited directly under a barrier overcoating 150 disposed between the functional layer 140 and the overlying dielectric coating 160.

The barrier under- and/or overlayers, although deposited in the form of a metal and presented as being metallic layers, are in practice oxidized layers since their primary function is to become oxidized during the deposition of the multilayer in order to protect the functional layer.

This dielectric coating 160 may be finished off by an optional protection layer 168, in particular a layer based on oxide, notably under-stoichiometric in oxygen.

Figure 3:
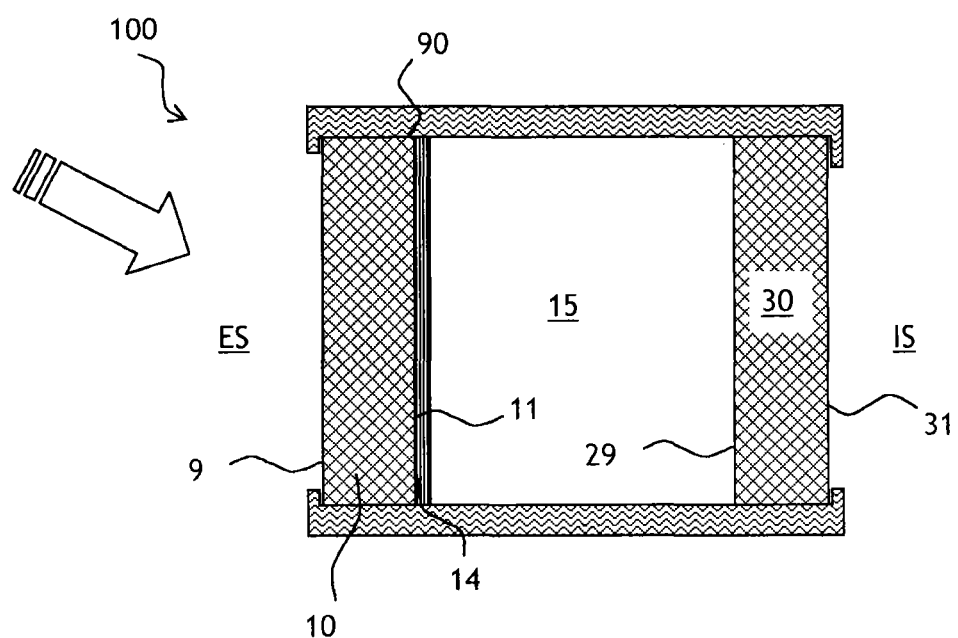

When a functional monolayer stack is used in a multiple glazing unit 100 with a double glazing unit structure, as illustrated in FIG. 3, this glazing unit comprises two substrates 10, 30 which are held together by a chassis structure 90 and which are separated from one another by a gas separation layer 15.

The glazing unit thus forms a separation between an external space ES and an internal space IS.

The multilayer can be positioned on face 2 (on the sheet furthest toward the outside of the building considering the incident direction of the sunlight entering into the building and on its face turned toward the gas layer).

FIG. 3 illustrates this positioning (the incident direction of the sunlight entering into the building being illustrated by the double arrow) on face 2 with a multilayer of thin films 14 positioned on an internal face 11 of the substrate 10 in contact with the gas separation layer 15, the other face 9 of the substrate 10 being in contact with the external space ES.

However, it may also be envisioned, in this double glazing structure, for one of the substrates to have a laminar structure; however, there is no confusion possible because, in such a structure, there is no gas separation layer.

Four examples have been implemented, numbered 1 to 4.

Example 1 has been implemented following the teaching of the international patent application No. WO 2010/072974: the two dielectric coatings 120, 160 each comprise an absorbing layer 123, 165 which is disposed within the dielectric coating between two dielectric layers 122, 124; 164, 166, the absorbing material of the absorbing layers 123, 165 being disposed symmetrically on either side of the functional metal layer 140.

The two dielectric layers 122, 124; 164, 166 which sandwich each absorbing layer are layers based on silicon nitride and a high index layer 126 is disposed on top of the layer 124, said high index layer 126 being in contact with an underlying wetting layer 128.

The high index layer is an oxide-based layer; it has a refractive index in the range between 2.3 and 2.7, and which is here equal to 2.46 precisely.

In this multilayer, the wetting layer 128 of zinc oxide doped with aluminum ZnO:Al (deposited from a metal target composed of zinc doped with 2% by weight of aluminum) allows the silver to crystallize which improves its conductivity.

The overlying dielectric coating 160 comprises a dielectric layer 162 of zinc oxide doped with aluminum ZnO:Al (deposited from a metal target composed of zinc doped with 2% by weight of aluminum) and a protection layer 168 based on an oxide.

The layers of silicon nitride 122, 124; 164, 166 are silicon nitride $Si_3N_4$ and are deposited from a metal target doped 8% by weight of aluminum.

The absorbing layers 123, 165 are metal being titanium.

For all the examples hereinafter, the deposition conditions for the layers are:

| Layer | Target used | Deposition pressure | Gas |
|---|---|---|---|
| $Si_3N_4$ | Si:Al at 92:8% wt | $1.5 \cdot 10^{-3}$ mbar | Ar/(Ar + N2) at 45% |
| $TiO_2$ | $TiO_x$ | $2 \cdot 10^{-3}$ mbar | Ar/(Ar + O2) at 90% |
| Ti | Ti | $7 \cdot 10^{-3}$ mbar | Ar at 100% |
| ZnO | Zn:Al at 98:2% wt | $2 \cdot 10^{-3}$ mbar | Ar/(Ar + O2) at 52% |
| NiCr | NiCr at 80:20 wt | $2 \cdot 10^{-3}$ mbar | Ar at 100% |
| Ag | Ag | $2 \cdot 10^{-3}$ mbar | Ar at 100% |

The deposited layers may thus be classified into four categories:
  i—layers of dielectric material, having a ratio n/k over the whole visible wavelength range greater than 5: $Si_3N_4$, $TiO_2$, ZnO
  ii—layers of absorbing material, having a ratio 0<n/k<5 over the whole visible wavelength range and a bulk electrical resistivity which is greater than $10^{-5}$ Ω·cm: Ti
  iii—functional metal layers of a material with reflective properties in the infrared and/or in the solar radiation band: Ag.
  iv—barrier over- and underlayers designed to protect the functional layer against a modification of its nature during the deposition of the multilayer; their influence on the optical and energy properties is in general ignored.

It has been observed that silver also has a ratio 0<n/k<5 over the whole visible wavelength range, but its bulk electrical resistivity is less than $10^{-5}$ Ω·cm.

In all the examples hereinafter, the multilayer of thin films is deposited on a substrate made of clear soda-lime glass of the Planilux brand, distributed by the company SAINT-GOBAIN, with a thickness of 4 mm.

For these substrates,
  R indicates: the resistance per square of the multilayer, in ohms per square;
  $T_L$ indicates: the light transmission in the visible in %, measured according to the illuminant D65 at 2°;
  $a_T^*$ and $b_T^*$ indicate: the colors in transmission a* and b* in the LAB system measured according to the illuminant D65 at 2°;
  $R_c$ indicates: the light reflection in the visible in %, measured according to the illuminant D65 at 2°, on the side of the substrate coated with the multilayer of thin films;
  $a_c^*$ and $b_c^*$ indicate: the colors in reflection a* and b* in the LAB system measured according to the illuminant D65 at 2°, on the side of the coated substrate;

$R_g$ indicates: the light reflection in the visible in %, measured according to the illuminant D65 at 2°, on the side of the uncoated substrate;

$a_g^*$ and $b_g^*$ indicate: the colors in reflection a* and b* in the LAB system measured according to the illuminant D65 at 2°, on the side of the uncoated substrate.

Furthermore, for these examples, when the substrate carrying the multilayer is integrated into a double glazing unit, the latter has the structure: 4-16-4 (Ar—90%), in other words two glass substrates, each having a thickness of 4 mm, are separated by a layer of gas composed of 90% argon and 10% air with a thickness of 16 mm.

All these examples have, in this configuration of double glazing unit, allowed a coefficient U, or coefficient K, calculated according the standard EN 673, of the order of 1.0 $W \cdot m^{-2} \cdot K^{-1}$ to be obtained (this is the heat transfer coefficient through the glazing unit; it denotes the quantity of heat passing through the substrate, in the stationary regime, per unit surface area and for a unit difference in temperature between the face of the glazing unit in contact with the external space and the face of the glazing unit in contact with the internal space).

For these double-glazing units,

FS indicates: the solar factor, in other words the ratio, in percent, of the total solar energy entering into the room through the glazing unit over the total incident solar energy;

S indicates: the selectivity corresponding to the ratio of the light transmission $T_L$ in the visible over the solar factor FS such that: $S = T_{L vis}/FS$;

$T_L$ indicates: the light transmission in the visible in %, measured according to the illuminant D65 at 2°;

$a_T^*$ and $b_T^*$ indicate: the colors in transmission a* and b* in the LAB system measured according to the illuminant D65 at 2°;

$R_e$ indicates: the external light reflection in the visible in %, measured according to the illuminant D65 at 2°, in the external space side ES;

$a_e^*$ and $b_e^*$ indicate: the colors in external reflection a* and b* in the LAB system measured according to the illuminant D65 at 2°, in the external space side ES;

$R_i$ indicates: the light reflection in the visible in %, measured according to the illuminant D65 at 2°, in the internal space side IS;

$a_i^*$ and $b_i^*$ indicate: the colors in internal reflection a* and b* in the LAB system measured according to the illuminant D65 at 2°, in the internal space side IS.

One example No. 1 has been implemented according to the multilayer structure illustrated in FIG. 1, with two absorbing layers 123 and 165 and an optional protection layer 168, but without an undercoating barrier 130.

Table 1 hereinafter illustrates the geometrical or physical thicknesses (and not the optical thicknesses) in nanometers of each of the layers in example 1:

TABLE 1

| Layer | Material | Ex. 1 |
| --- | --- | --- |
| 168 | TiO$_2$ | 1 |
| 166 | Si$_3$N$_4$:Al | 25.1 |
| 165 | Ti | 2.1 |
| 164 | Si$_3$N$_4$:Al | 25.1 |
| 162 | ZnO:Al | 9 |
| 150 | NiCr | 0.2 |
| 140 | Ag | 18.1 |
| 128 | ZnO:Al | 5 |
| 126 | TiO$_2$ | 12 |

TABLE 1-continued

| Layer | Material | Ex. 1 |
| --- | --- | --- |
| 124 | Si$_3$N$_4$:Al | 13.8 |
| 123 | Ti | 2.1 |
| 122 | Si$_3$N$_4$:Al | 13.8 |

Table 2 hereinafter summarizes the main optical and energy characteristics of this example 1, respectively when only the substrate 10 alone is considered and when it is configured as a double glazing unit, on face 2, F2, as in FIG. 3.

TABLE 2

| | R | $T_L$ | $a_T^*$ | $b_T^*$ | $R_c$ | $a_c^*$ | $b_c^*$ | $R_g$ | $a_g^*$ | $b_g^*$ |
| --- | --- | --- | --- | --- | --- | --- | --- | --- | --- | --- |
| 10 | 1.9 | 40.89 | −3.49 | 4.74 | 16.41 | −0.33 | −25.8 | 18.94 | 4.06 | −5.81 |

| | FS | s | $T_L$ | $R_e$ | $R_i$ |
| --- | --- | --- | --- | --- | --- |
| F2 | 27.26 | 1.37 | 37.38 | 20.35 | 21.86 |

Thus, as can be seen in this table 2, the external light reflection $R_e$ of the glazing unit is of the order of 20% since the reflection on the glass side of the substrate is less than 19% and the color in external reflection is relatively neutral.

The relatively low solar factor could allow a high selectivity to be attained, but as the light transmission in the visible $T_L$ is too low, in the end, the selectivity is relatively low.

It is then desirable to obtain a higher light transmission, with a relatively low solar factor, in order to increase the selectivity while at the same time conserving an external reflection $R_e$ at a low value of around 20%, or even less as a double glazing unit, which is equivalent to an external reflection of the substrate alone, on the glass side, at a value less than or equal to 19%.

Figure 2:
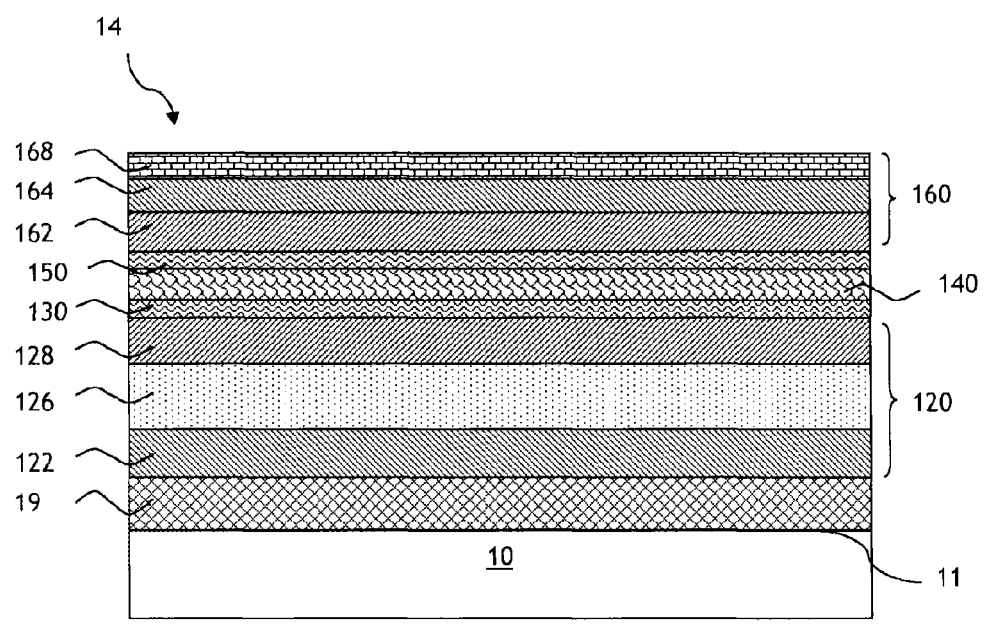
in FIG. 2, a functional monolayer stack according to the invention, the functional layer being deposited directly onto a barrier undercoating and directly under a barrier overcoating; and in FIG. 3, a double glazing solution incorporating a functional monolayer stack.

An example 2 has subsequently been implemented on the basis of the multilayer illustrated in FIG. 2, by following the teaching of the invention and by thus disposing in the multilayer a single absorbing metal layer, here of titanium Ti, the layer 19, directly in contact with the substrate, then directly under a dielectric layer 122 based on a nitride not comprising any oxygen.

Here, the dielectric layer 122 comprises silicon nitride but cannot be silicon oxynitride because such a material comprises oxygen.

Table 3 hereinafter illustrates the geometrical thicknesses in nanometers of each of the layers in example 2:

TABLE 3

| Layer | Material | Ex. 2 |
| --- | --- | --- |
| 168 | TiO$_2$ | 1 |
| 164 | Si$_3$N$_4$:Al | 44 |
| 162 | ZnO:Al | 9 |
| 150 | NiCr | 0.2 |
| 140 | Ag | 18.1 |
| 128 | ZnO:Al | 5 |
| 126 | TiO$_2$ | 12 |
| 122 | Si$_3$N$_4$:Al | 18.6 |
| 19 | Ti | 0.8 |

This example 2 is thus substantially identical to example 1 with as main difference: the two absorbing layers 123 and 165 of 2.1 nanometers each in example 1 have been replaced by the single absorbing layer 19 with a thickness of 0.8 nm.

Table 4 hereinafter summarizes the main optical and energy characteristics of this example 2, respectively when only the substrate 10 alone is considered and when the latter is configured as a double glazing unit F2, on face 2, as in FIG. 3. This table presents the same structure as table 2.

TABLE 4

| R | $T_L$ | $a_T^*$ | $b_T^*$ | $R_c$ | $a_c^*$ | $b_c^*$ | $R_g$ | $a_g^*$ | $b_g^*$ |
|---|---|---|---|---|---|---|---|---|---|
| 10 | 1.9 | 62.78 | −3.39 | 6.31 | 22.03 | 4.74 | −13.8 | 18.29 | 2.59 | −5.89 |

| | FS (%) | s | $T_L$ | $R_e$ | $R_i$ |
|---|---|---|---|---|---|
| F2 | 38.35 | 1.5 | 57.66 | 21.2 | 26.5 |

As can be seen in this table 4, the external light reflection $R_e$ is very satisfactory when the multilayer is positioned on face 2: it is around 21%.

Similarly, the color seen from the outside has little difference from that of example 1 and remains neutral.

Table 5 hereinafter illustrates the ranges of preferred physical thicknesses in nanometers, based on example 2:

TABLE 5

| Layer | Material | Preferred ranges | Most-preferred ranges |
|---|---|---|---|
| 168 | TiO$_2$ | 0.5-2 | 0.5-2 |
| 164 | Si$_3$N$_4$:Al | 35-50 | 35-50 |
| 162 | ZnO:Al | 5-10 | 5-10 |
| 150 | NiCr | 0.2-2.5 | 0.2-2.5 |
| 140 | Ag | 15-20 | 15-20 |
| 128 | ZnO:Al | 4-8 | 4-8 |
| 124 | TiO$_2$ | 5-15 | 5-15 |
| 122 | Si$_3$N$_4$:Al | 10-20 | 10-20 |
| 19 | Ti | 0.5-1.5 | 0.6-1.2 |

Table 6 hereinafter summarizes the main optical and energy characteristics which may be respectively targeted with these preferred ranges and most-preferred ranges, respectively when only the substrate 10 is considered and when the latter is configured as a double glazing unit F2, on face 2, as in FIG. 3.

TABLE 6

| | $T_L$ | $R_g$ |
|---|---|---|
| 10 preferred | >60 | <19 |
| 10 most preferred | >62 | <19 |

| | $T_L$ | FS (%) | s |
|---|---|---|---|
| F2 preferred | >55 | <40 | >1.45 |
| F2 most preferred | ≥57 | ≤39 | ≥1.5 |

As can be seen in this table 6, the light reflection of the substrate alone, coated with the multilayer, on the glass side, $R_g$, is very satisfactory: it is less than 19%.

The light transmission of the substrate coated with the multilayer is high; that of the double glazing unit is consequently also high.

Although the solar factor is not very low, the selectivity is high.

Furthermore, the color seen from the outside has little difference from that of example 1 and remains neutral.

Two other examples, examples 3 and 4, have been implemented based on example 2 in order to illustrate what happens when the absorbing layer 19 is in contact with a layer of oxide, respectively for example 3 when the dielectric layer 122 is replaced by a layer of ZnO:Al, with an identical index (and with an identical optical thickness) and for example 4 when the dielectric layer 122 is eliminated and when the high index layer 126 is thickened (in order for the dielectric coating 120 underlying the functional layer to keep the same optical thickness).

Examples 3 and 4 are thus identical to example 2 except in that:

for example 3, the dielectric layer 122 of example 2 is replaced by a dielectric layer of the same material as the layers 128 and 162, in this case of ZnO:Al, this layer having a physical thickness of 18.6 nm;

for example 4, the dielectric layer 122 in example 2 is eliminated and the high index layer 126, of TiO$_2$, is thickened in order to reach a total physical thickness of 27.1 nm.

Tables 7 and 8 hereinafter summarize the main optical and energy characteristics of these examples 3 and 4, respectively, when only the substrate 10 alone is considered and when the latter is configured as a double glazing unit F2, on face 2, as in FIG. 3. These tables each present the same structure as table 4.

TABLE 7

| example 3 | | | | | | | | | |
|---|---|---|---|---|---|---|---|---|---|
| R | $T_L$ | $a_T^*$ | $b_T^*$ | $R_c$ | $a_c^*$ | $b_c^*$ | $R_g$ | $a_g^*$ | $b_g^*$ |
| 10 | 1.9 | 61.5 | −2.7 | 5.0 | 24.2 | 3.1 | −11.1 | 22.1 | 0.8 | −3.4 |

| | FS (%) | S | $T_L$ | $R_e$ | $R_i$ |
|---|---|---|---|---|---|
| F2 | 37.8 | 1.5 | 56.5 | 25.3 | 28.4 |

As can be seen in this table 7, the light transmission of the coated substrate is degraded by the contact Ti/ZnO since it decreases by more than 1% with respect to that of example 2.

Moreover, the light reflection on the glass side $R_g$ of the coated substrate is also degraded since it increases by almost 4%.

Thus, if this example 3 is used in a double glazing unit, with the multilayer positioned on face 2, the selectivity is indeed conserved, but the light transmission $T_L$ is less than for example 2 (decrease of 1.5%) and the external light reflection $R_e$ increases (by 3.7%).

Although the color of the double glazing unit seen from the outside is little different from that of example 2 and remains acceptable, the lower light transmission and the higher external reflection are not acceptable with regard to the objective sought.

TABLE 8

| example 4 | | | | | | | | | |
|---|---|---|---|---|---|---|---|---|---|
| R | $T_L$ | $a_T^*$ | $b_T^*$ | $R_c$ | $a_c^*$ | $b_c^*$ | $R_g$ | $a_g^*$ | $b_g^*$ |
| 10 | 1.9 | 64.8 | −4.2 | 8.9 | 19.1 | 7.6 | −19.3 | 14.4 | 6.1 | −10.5 |

| | FS (%) | S | $T_L$ | $R_e$ | $R_i$ |
|---|---|---|---|---|---|
| F2 | 38.5 | 1.5 | 58.5 | 15.8 | 24.0 |

As can be seen in this table 8, the light transmission of the coated substrate is improved by the contact Ti/TiO$_2$ since it increases by 2% with respect to that of example 2.

Moreover, the light reflection on the glass side $R_g$ of the substrate coated is also improved since it decreases by almost 4%.

However, the color in transmission of the coated substrate is degraded, in particular due to the high value of $b^*_t$.

Furthermore the color in reflection of the coated substrate on the uncoated side is degraded due to the high values (in absolute values) of $a^*_g$ and $b^*_g$.

The color in reflection of the coated substrate on the coated side is also degraded due to the high values (in absolute values) of $a^*_c$ and $b^*_c$.

Although the higher light transmission and the lower external reflection of example 4 with respect to example 2 would be acceptable with regard to the objective sought, the color of the double glazing unit seen from the outside is unacceptable.

With the invention, it is possible to combine a high selectivity, a low emissivity and a low external light reflection with a multilayer comprising a single functional metal layer of silver or containing silver, while at the same time conserving a suitable esthetic appearance (the $T_L$ is greater than 60% and the colors are neutral in reflection).

The use of only one absorbing layer simplifies the fabrication and reduces the cost with respect to the use of two absorbing layers; all the more so as the thickness of this single absorbing layer is less than the sum of the thicknesses of the two absorbing layers needed in the prior art.

Furthermore, the mechanical resistance of the multilayer according to the invention is very high. Furthermore, the general resistance to chemical attack of this multilayer is overall very good.

Furthermore, although this is not illustrated, it may be envisioned for a substrate 30 to comprise, on at least one face 29 in contact with the gas separation layer 15 and which does not comprise a multilayer of thin films with reflective properties in the infrared and/or in the solar radiation band, an antireflective coating which is facing said gas separation layer 15 with the multilayer of thin films 14 with reflective properties in the infrared and/or in the solar radiation band.

The goal of this insertion of an antireflective coating in a double glazing unit structure is to allow a high light transmission and a high solar factor to be obtained.

The present invention is described hereinabove by way of example. It is understood that those skilled in the art are able to construct many variants of the invention without however straying from the framework of the patent such as defined by the claims.

The invention claimed is:

1. A coated substrate consisting of a substrate coated on one face with a multilayer, said multilayer comprising, in the following order from the face of the substrate:
    an absorbing layer, which is a metal layer having a physical thickness in the range between 0.5 nm and 1.5 nm and which is situated directly on said face;
    a first dielectric coating comprising at least one dielectric layer, wherein the first dielectric layer comprises a dielectric layer of a nitride not comprising any oxygen that is in direct contact with the absorbing layer;
    optionally a barrier undercoating comprising nickel or titanium and having a physical thickness e' such that 0.2 nm≤e'≤2.5 nm;
    a single functional metal layer having reflective properties in an infrared and/or in a solar radiation band;
    optionally a barrier overcoating comprising nickel or titanium and having a physical thickness e' such that 0.2 nm≤e'≤2.5 nm; and
    a second dielectric coating comprising at least one dielectric layer,
    wherein:
    the multilayer comprises no more than one absorbing layer excluding the optional barrier overcoating and the optional barrier undercoating;
    if the barrier undercoating is present, the functional layer is deposited directly onto the barrier undercoating; and
    if the barrier overcoating is present, the functional layer is deposited directly under the barrier undercoating.

2. The substrate of claim 1, wherein the metal absorbing layer is a layer of titanium.

3. The substrate of claim 1, wherein the first dielectric coating comprises a high index layer of a material having a refractive index in the range between 2.3 and 2.7.

4. The substrate of claim 3, wherein the high index layer has a physical thickness in the range between 5 and 15 nm.

5. The substrate of claim 1, wherein a physical thickness of the dielectric layer of nitride is in the range between 10 and 20 nm.

6. The substrate of claim 1, wherein the barrier undercoating is present and/or the barrier overcoating is present.

7. The substrate of claim 1, wherein a final layer of an overlying dielectric coating layer furthest from the substrate is an oxide based on titanium oxide ($TiO_x$) or a mixed oxide of zinc and tin ($SnZnO_x$).

8. A multiple glazing unit, comprising at least two substrates which are held together by a chassis structure, said glazing unit forming a separation between an external space and an internal space,
    wherein:
    at least one gas separation layer is disposed between the two substrates; and
    at least one of the two substrates is a substrate of claim 1.

9. The multiple glazing unit of claim 8, wherein
    the glazing unit exhibits a selectivity S, which corresponds to a ratio of a light transmission $T_L$ in visible over a solar factor FS, >1.45 while at the same time having a light transmission $T_L$>55%, or
    wherein the glazing unit exhibits a selectivity S≥1.5 while at the same time having a light transmission $T_L$≥57%.

10. The substrate of claim 1, wherein the single functional metal layer is a metal layer comprising silver or a metal alloy containing silver.

11. The substrate of claim 1, wherein the metal layer has a physical thickness in the range between 0.6 nm and 1.2 nm.

12. The substrate of claim 3, wherein the high index layer comprises an oxide.

13. The substrate of claim 5, wherein the dielectric layer of nitride comprises silicon nitride $Si_3N_4$.

* * * * *